US010633074B2

(12) United States Patent
Seibt

(10) Patent No.: US 10,633,074 B2
(45) Date of Patent: Apr. 28, 2020

(54) RETAINING SYSTEM FOR A MOVABLE COMPONENT

(71) Applicant: Airbus Operations GmbH, Hamburg (DE)

(72) Inventor: Christian Seibt, Hamburg (DE)

(73) Assignee: Airbus Operations GmbH (DE)

( * ) Notice: Subject to any disclaimer, the term of this patent is extended or adjusted under 35 U.S.C. 154(b) by 712 days.

(21) Appl. No.: 15/284,795

(22) Filed: Oct. 4, 2016

(65) Prior Publication Data

US 2017/0043857 A1    Feb. 16, 2017

Related U.S. Application Data

(63) Continuation of application No. PCT/EP2015/057025, filed on Mar. 31, 2015.

(30) Foreign Application Priority Data

Apr. 7, 2014  (DE) .................. 10 2014 104 921

(51) Int. Cl.
*B64C 1/14* (2006.01)
*B64D 11/02* (2006.01)
(Continued)

(52) U.S. Cl.
CPC .......... *B64C 1/1407* (2013.01); *B64C 1/1423* (2013.01); *B64C 1/1469* (2013.01);
(Continued)

(58) Field of Classification Search
CPC .. B64C 1/1469; B64C 1/1407; B64D 11/0691
See application file for complete search history.

(56) References Cited

U.S. PATENT DOCUMENTS

| 4,989,808 A | * | 2/1991 | Spraggins | ............. | B64C 1/1407 244/118.5 |
| 4,993,666 A | * | 2/1991 | Baymak | ................... | B09B 1/00 244/122 R |

(Continued)

FOREIGN PATENT DOCUMENTS

| DE | 10 2007 060 514 A1 | 7/2009 |
| DE | 10 2011 011 704 A1 | 12/2012 |

(Continued)

OTHER PUBLICATIONS

DE 102014104921.7 Search Report dated Jan. 20, 2015, p. 2 (categorizing cited references).
(Continued)

*Primary Examiner* — Philip J Bonzell
*Assistant Examiner* — Michael B. Kreiner
(74) *Attorney, Agent, or Firm* — Lerner, David, Littenberg, Krumholz & Mentlik, LLP

(57) ABSTRACT

To be able to transmit higher forces when retaining movable components on board an aircraft, a retaining system includes a support structure with a first retaining area and a second retaining area having a movable locking element, and a movable component with a locking receptacle forming a locking device with the locking element, and a retaining device. The movable component is movably attached to the first retaining area with the retaining device, and the movable component can be locked on the second retaining area with the locking device. The at least one movable locking element can be moved between an open setting ($S_{OFF}$) and a locked setting ($S_{VER}$), wherein the at least one movable locking element engages with the locking receptacle in the locked setting, so that the movable component is temporarily immovably retained, and allows the movable component to move in the open setting.

10 Claims, 11 Drawing Sheets

(51) Int. Cl.
  *B64D 11/06* (2006.01)
  *B64D 11/00* (2006.01)
  *B64D 11/04* (2006.01)

(52) U.S. Cl.
  CPC ............ *B64D 11/003* (2013.01); *B64D 11/02* (2013.01); *B64D 11/04* (2013.01); *B64D 11/0691* (2014.12)

(56) References Cited

U.S. PATENT DOCUMENTS

| | | | | |
|---|---|---|---|---|
| 6,079,669 | A * | 6/2000 | Hanay | B64D 11/02 244/118.5 |
| 6,116,542 | A | 9/2000 | Erben | |
| 6,691,953 | B2 * | 2/2004 | Leclerc | B64C 1/1407 244/129.5 |
| 6,702,231 | B2 * | 3/2004 | Ward | B64C 1/1469 244/118.5 |
| 6,702,232 | B2 * | 3/2004 | Dovey | B64C 1/1469 244/118.5 |
| 7,014,148 | B2 * | 3/2006 | Dominguez | B64C 1/1469 244/118.5 |
| 7,255,376 | B2 | 8/2007 | Pratt et al. | |
| 7,823,834 | B2 | 11/2010 | French et al. | |
| 7,984,875 | B2 * | 7/2011 | Koehn | B64C 1/1469 244/118.5 |
| 8,789,855 | B2 * | 7/2014 | Koneczny | B64C 1/1407 292/201 |
| 8,876,050 | B2 * | 11/2014 | Wentland | B64C 1/1407 244/118.5 |
| 9,145,209 | B2 * | 9/2015 | Weitzel | B64D 11/06 |
| 9,340,293 | B2 * | 5/2016 | Guering | B64D 11/06 |
| 9,346,548 | B2 | 5/2016 | Schliwa et al. | |
| 10,189,571 | B2 * | 1/2019 | Seibt | B64D 11/02 |
| 10,220,933 | B2 * | 3/2019 | Koch | B64C 1/1469 |
| 2005/0247823 | A1 * | 11/2005 | Wood | B29C 45/14 244/129.5 |
| 2009/0006641 | A1 | 1/2009 | Yaqoob et al. | |
| 2009/0065641 | A1 | 3/2009 | Koehn et al. | |
| 2013/0126671 | A1 | 5/2013 | Guering | |
| 2017/0106983 | A1 * | 4/2017 | Castanos | B64D 11/0691 |

FOREIGN PATENT DOCUMENTS

| | | |
|---|---|---|
| EP | 0 867 365 A2 | 9/1998 |
| EP | 1 048 562 A2 | 11/2000 |
| EP | 2 724 938 A1 | 4/2014 |
| EP | 2 815 974 A1 | 12/2014 |
| RU | 2124459 C1 | 1/1999 |
| RU | 2389658 C2 | 5/2010 |
| WO | 2015/124794 A1 | 8/2015 |

OTHER PUBLICATIONS

Sep. 30, 2015 International Search Report and Written Opinion PCT/EP2015/057025.

* cited by examiner

RETAINING SYSTEM FOR A MOVABLE COMPONENT

CROSS-REFERENCE TO RELATED APPLICATIONS

This application is a continuation of International Application No. PCT/EP2015/057025 filed Mar. 31, 2015, published on Oct. 15, 2015, which claims priority from German Patent Application No. 10 2014 104 921.7 filed Apr. 7, 2014, all of which are incorporated herein by reference.

FIELD OF THE INVENTION

The present invention relates to retaining movable components on board an aircraft, and in particular relates to a retaining system for a movable component on board an aircraft, a module for a cabin in an aircraft, an aircraft, a method for locking and releasing a movable component on board an aircraft, and a use of a retaining system in an aircraft.

BACKGROUND OF THE INVENTION

For example, movable components are used on board aircrafts to lock a room or make it accessible. Movable components include the doors of lavatories as an example. The movable components are here movably attached to retaining structures on the one hand, and can be locked for fixation purposes. For example, a door to a lavatory can be locked in the closed position to prevent the door from being undesirably opened, e.g., when using the bathroom. For example, DE 10 2011 011 704 describes a lavatory arrangement for a vehicle. However, it was found that manually activated bolts for locking a bathroom door are often unable to transmit additional forces, i.e., higher forces.

BRIEF SUMMARY OF THE INVENTION

Therefore, there may be a need to provide a retaining system for a movable component on board an aircraft, which is able to also transmit higher forces.

According to the invention, a retaining system for a movable component for separating a room segment on board an aircraft is provided. The retaining system comprises a support structure with a first retaining area and a second retaining area. Further, the retaining system comprises a movable component, a retaining device and a locking device. The moveable component is movably attached to the first retaining area with the retaining device, and can be locked to the second retaining area with the locking device. The locking device comprises at least one movable locking element and at least one locking receptacle. The at least one movable locking element can move between an open setting and a locked setting. The at least one movable locking element engages with the locking receptacle in the locking setting, so that the movable component is temporarily immovably retained, and allows the movable component to move in the open setting. The at least one movable locking element is situated on the second retaining area, and the at least one locking receptacle is situated on the movable component.

The advantage to situating the movable locking elements on the second retaining area, i.e., on the support structure, and not on the movable component itself, is that reinforced locking elements can also be provided, but do not also have to be moved while opening or moving the movable component. This enables a higher force transmission, and facilitates moving the movable component to the greatest extent possible. The movable component itself is provided with the locking receptacle, but the latter as a rule requires less weight and installation space, since it can be fixed in place, and does not require an additional movement mechanism, e.g., of the kind required for the at least one movable locking element. Because the locking elements are integrated into the fixed lateral part, e.g., a door frame, the movable component, e.g., a door leaf, is not weakened. In addition, arranging the movable locking elements in the lateral, fixed portion on the movable component eliminates the need to set aside or budget for corresponding installation space.

The movable component is a room-separating or room-forming component, i.e., a component that is able to at least visually separate a room or room region. The locking receptacles can also be referred to as fixed locking receptacles.

An example provides several movable locking elements, e.g., two, three, four, five or more, e.g., six, seven, eight, nine or ten movable locking elements, or more. A matching number of locking receptacles is provided.

According to an example, the movable component is a door element, and the at least one locking receptacle is provided on the door element.

For example, the door element can be a door leaf. Provided as the movable component in another example is a movable functional device, which is combined with a door leaf or a door leaf segment. For example, the functional device can be a storage device (e.g., a stowage compartment or stowage cabinet), a holding device (e.g., a wardrobe hook) or a display device (e.g., a monitor), or also a seat device.

For example, this enables a lavatory door in which increased forces can be transmitted in the closed setting, and in which the door element itself can simultaneously be given a more lightweight design, since the movement mechanism for the locking elements is situated in the fixed portion, e.g., the door frame. The lavatory door serves as an access point to the lavatory room behind it.

In an example, the support structure forms a frame, and the first retaining area is provided on one frame side and the second retaining area is situated on an opposing frame side. For example, the movable component is a pivoting or swiveling door, and the movable locking elements can move in a radial direction. In another example, the movable component is a sliding door, and the movable locking elements can move in a direction that is, for example, perpendicular to the sliding direction, or also in a swiveling direction perpendicular to the sliding motion. Another example provides a swiveling motion in a plane that also accommodates the sliding direction.

According to an example, the movable component is a movable panel element.

For example, this makes it possible to temporarily partition a room segment, e.g., a hall or corridor area in an aircraft.

According to an example, the support structure comprises a third retaining area, wherein at least one additional movable locking element is provided. The movable component can be locked in a primary retaining position on the second retaining area, and in a secondary retaining position on the third retaining area. The movable locking element is used for locking in the primary retaining position, while the at least one additional movable locking element, for example, is used for latching in the secondary retaining position.

An example provides a plurality of movable locking elements and locking receptacles, as well as a plurality of additional movable locking elements. Another example provides for a plurality of movable locking elements, but only one additional movable locking element.

According to an example, a first plurality of movable locking elements is provided, and a second plurality of matching locking receptacles.

For example, the plurality of movable locking elements is designed as a swiveling bolt, wherein the movable locking elements each can be swiveled around a fulcrum between the open setting and locked setting.

In an example, the plurality of movable locking elements can be moved with a shared control element, for example with a shared rod assembly segment, or also via a shared wire rope hoist.

In an example, the movable locking elements engage behind a strike plate in the locked setting. For example, the term "engage behind" relates to the direction of movement of the movable component, and in any event prevents the movable component from moving in relation to the support structure.

In an example, the swiveling bolts are provided in the door frame, and the strike plate on the door leaf.

According to an example, a temporarily usable seat is secured to the movable component.

For example, the seat involves a seat for flight attendants (so-called Cabin Attendant Seat, CAS, also referred to as Flight Attendant Seat, FAS), which only is used in certain phases of flight operation, e.g., during landing and takeoff, or also in the event of inflight turbulence. Also referred to as a Standard CAS, the CAS can be a defined structural unit not to be adapted, which is secured to the door by mechanical interfaces, and among other things comprises a seat or folding seat, which is attached to the Standard CAS structural unit by way of a hinge. The potential advantage to this arrangement is that less room is used overall for the vehicle attendant seat and lavatory. This leaves more room for a larger number or more generous distribution of passenger seats.

In an example, the seat comprises a seat surface that can be moved from a use setting into a stowed setting. The seat surface is essentially situated horizontally in the use setting, and essentially vertically in the stowed setting.

The seat can be a folding seat, which be swiveled from an essentially perpendicular stowed position into an essentially horizontal operating position. The seat can encompass only one seat surface, but also a backrest and/or a headrest. The hinge between the door of the module and the seat can essentially run horizontal or parallel to the floor.

In another embodiment, the retaining system comprises a locking mechanism, in particular a taxi/takeoff/landing (TTL) locking mechanism, which is designed to only allow the seat to swivel from the essentially perpendicular stowed position into the essentially horizontal operating position if the door is locked. As a consequence, it can be ensured that a person will only be able to sit on the seat if the door is locked. Accordingly, the locking mechanism also only allows the seat to be swiveled or folded out if the door is locked. For example, the seat can be occupied by a flight attendant during takeoff or landing, since a room lying behind the door, e.g., a lavatory or lavatory module, is not in use at this time anyway, so that the door (of the lavatory module) can remain locked.

The locking mechanism can comprise a lever, for example in the form of a control lever, of the kind that can be used in the area of an onboard kitchen (galley) for securing a serving cart (trolley) in the stowed position, so that the seat can be swiveled out when actuating the lever after the door has been locked. It is noted that the lever can be a TTL lever (taxi/takeoff/landing lever). Such a control lever, for example used for onboard kitchens, can be designed with a spring-loaded system for travel limitation. For example, the lever or control lever can be moved from the open into the closed state via rotation by ¼ or 90°. The travel in the form of a ¼ rotation from the open into the closed state and vice versa can also be achieved with other systems, for example with a biased, movable rotational axis of the control lever and stop position points that can secure the control lever in a groove. The groove can consist of a ramp and end stop.

In the locked position of the lever, the door is unlocked, so that the seat cannot be swiveled out. Accordingly, the seat cannot be moved into the essentially horizontal operating position when the lever is in the locked position.

From the locked to unlocked position of the lever, the door can be closed and secured, for example by way of a door lock or door locking mechanism. Only in the closed door position, the seat can be folded down given the exemplary arrangement next to a protruding, adjacent module.

In the unlocked position of the lever, the door is additionally locked or cannot be opened, thereby allowing the seat to swivel out. Accordingly, the seat can be moved into the essentially horizontal operating position if the lever is in the unlocked position. This correlation will be explained in even more detail in the description to the figures.

The invention also provides a module for a cabin of an aircraft. The module comprises a module interior and a wall structure. The wall structure at least partially envelops the module interior, and is designed with at least one retaining system having a movable component according to one of the preceding examples.

The invention also provides an aircraft, which comprises a fuselage structure and a cabin area situated in the fuselage structure. The cabin area comprises at least one module from the group of a bathroom (also referred to as lavatory), washroom, stowage space, closet, relaxation area, monument, onboard kitchen and staircase. The at least one module is designed like a module according to the preceding example.

For example, the aircraft is an airplane, in particular a passenger plane. For example, the aircraft is a helicopter or airship.

The invention also provides a method for locking and releasing a movable component on board an aircraft. The method comprises the following steps:

In a first step, a support structure is provided with a first retaining area and a second retaining area.

In a second step, a movable component is provided, which is movably attached to the first retaining area with a retaining device, and can be locked on the second retaining area with a locking device, wherein the locking device comprises at least one movable locking element and at least one locking receptacle.

A third step provides that the at least one movable locking element is moved between an open setting and a locked setting, so as to temporarily lock or release the movable component. The at least one movable locking element engages with the locking receptacle in the locked setting, so that the movable component is temporarily immovably retained, and allows the movable component to move in the open setting. The at least one movable locking element is situated on the second retaining area, and the at least one locking receptacle is situated on a movable component.

An example provides that the movable component is initially fixed in place with a secondary locking device, after which the locking described above takes place as a primary locking device. For example, the secondary locking device is a snapping-in door catch.

The invention also provides for the use of a system according to one of the preceding examples in an aircraft.

An aspect of the invention provides that the movable locking elements are situated on the fixed frame part on a movable element, for example a door element, and that the door element itself only comprises receptacles or other fixed, suitable counterparts to the locking elements. The movement mechanism for locking and unlocking is thus integrated into the frame construction. As a consequence, for example, a larger number and even more strongly designed locking elements can be provided without increasing the weight of the movable component, in particular a door.

It is noted that the features in the exemplary embodiments of the devices also apply to embodiments for the method and use of the device and vice versa. In addition, it is possible to freely combine those features with each other for which doing so is not explicitly mentioned.

BRIEF DESCRIPTION OF THE DRAWINGS

The attached drawings will be used below to discuss exemplary embodiments of the invention in greater detail. Shown on.

DETAILED DESCRIPTION

Figure 1:
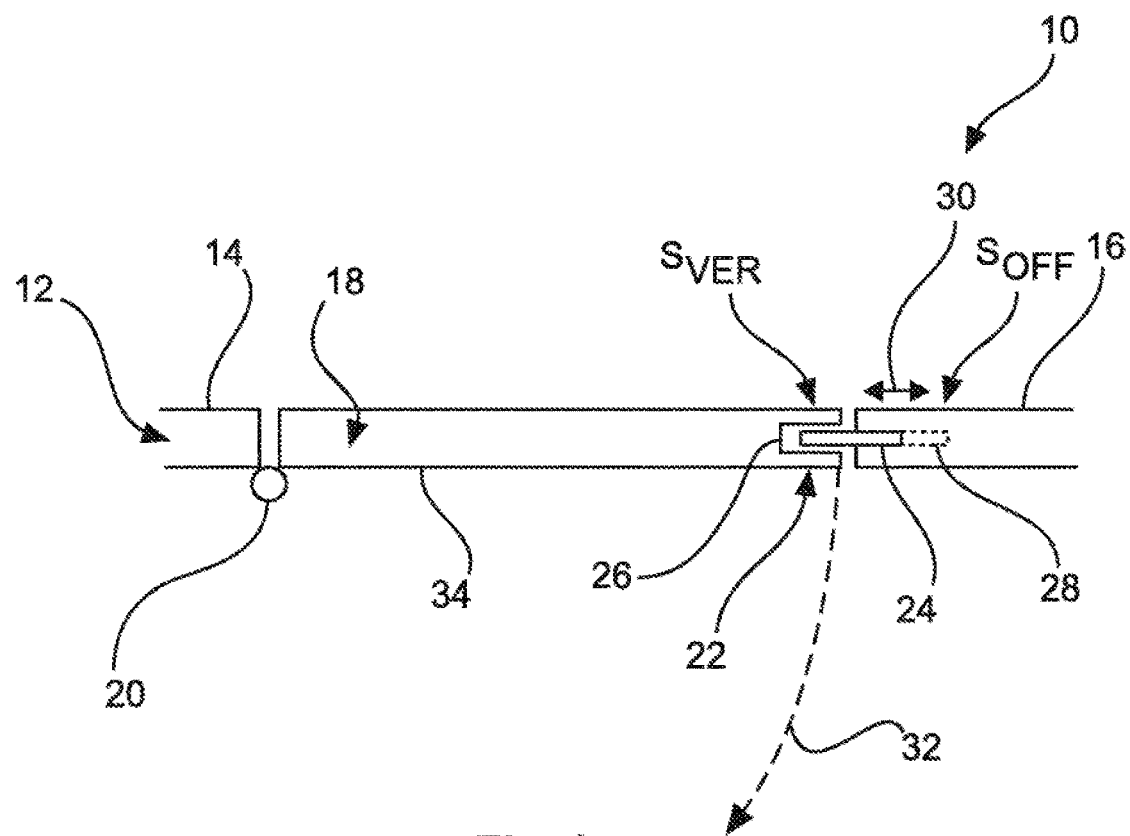
FIG. 1 is a schematic horizontal section through an example of a retaining system with a movable component.

FIG. 1 shows a first example of a retaining system 10 for a movable component used to partition a room segment on board an aircraft. The retaining system 10 comprises a support structure 12 with a first retaining area 14 and a second retaining area 16. Additionally provided is a movable component 18 and a retaining device 20 and locking device 22. The movable component 18 is movably attached to the first retaining area 14 with the retaining device 20. The movable component 18 can be locked to the second holding area 16 (e.g., a doorpost or a wall element) with the locking device 22. For this purpose, the locking device comprises at least one movable locking element 24 and at least one locking receptacle 26. The at least one movable locking element 24 can move between a locked setting $S_{VER}$ and an open setting $S_{OFF}$. FIG. 1 shows the movable locking element 24 in the locked setting $S_{VER}$. The arrangement in the open setting $S_{OFF}$ is denoted by a dashed line 28. A double arrow 30 points to the movability of the at least one movable locking element 24. The at least one movable locking element 24 engages with the locking receptacle 26 in the locked setting $S_{VER}$, so that the movable component 18 is temporarily kept immobile. The movable component 18 is allowed to move in the open setting $S_{OFF}$, as indicated with a dashed arrow 32. The at least one movable locking element 24 is situated on the second retaining area 16, and the at least one locking receptacle 26 is situated on the movable component 18.

The locking elements can be completely retracted in the open setting $S_{OFF}$, i.e., disappear completely in a retaining structure and no longer protrude. For example, the locking elements can disappear in a doorpost.

The term "locking elements" relates primarily to the function of locking, and not necessarily to the geometric design as a locking bolt. The locking elements can be configured like swiveling bolts or sliding bolts. However, other elements such as hooks or pins can also be used as the locking elements.

For example, the movable component 18 involves a door element 34, or a door, as denoted in FIG. 1. The at least one locking receptacle 26 is provided on the door element 34, for example in the area of a front face. For example, the retaining device 20 consists of one (or more) hinge device(s), e.g., several door hinges or a hinge device configured throughout like a type of piano hinge.

Figure 2:
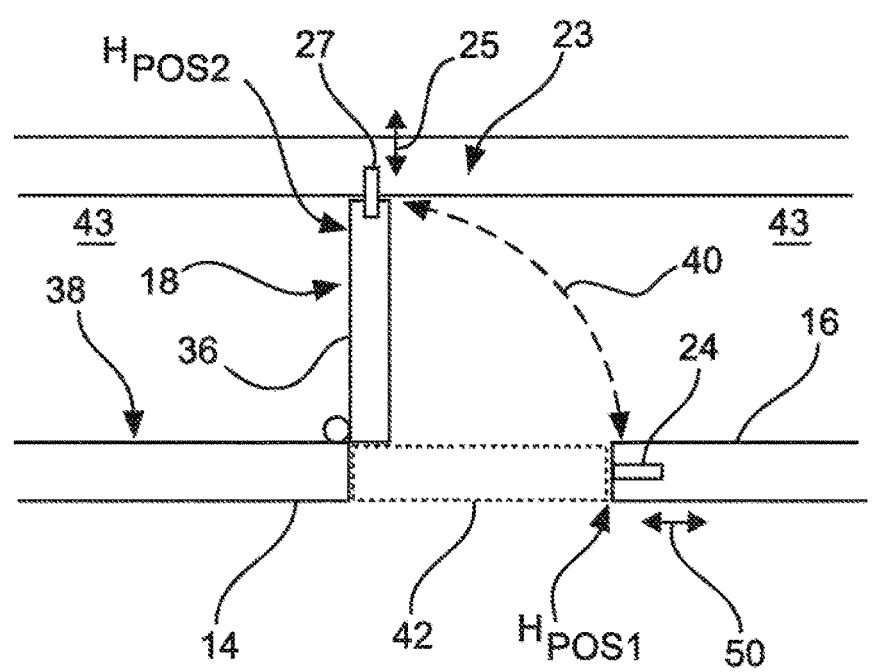
FIG. 2 is a horizontal section through another example of a retaining system.

In another example, the movable component 18 is a movable panel element 36, e.g., as denoted in FIG. 2. For example, the movable panel element 36 can be swiveled out of a wall surface 38, as denoted by a dashed double arrow 40. A dashed frame line 42 denotes the arrangement of the movable panel element 36 in the wall surface 38.

For example, the movable panel element 36 can partition room areas or subdivide room areas, e.g., to subdivide a hall or corridor area 43, which is also referred to as aisle area, as denoted in FIG. 2. The movable panel element 36 can also be used as a partition for an onboard kitchen area.

The support structure 12 here comprises a third retaining area 23, for example, wherein at least one additional movable locking element 27 is provided. The movability of the additional locking element 27 is denoted with a double arrow 25. The movable panel element 36 can be locked to the second retaining area 16 in a primary retaining position $H_{POS1}$, i.e., in a setting denoted by the dashed frame line 42.

The movability of the movable locking element 24 is denoted with an additional double arrow 50. The movable panel element 36 can be locked on the third retaining area 23 in a secondary retaining position $H_{POS2}$, as shown.

The movable panel element 36 can also be situated in front of an existing wall structure, so that a continuous wall surface is further created in the secondary retaining position $H_{POS2}$.

As an insert, it is provided, for example, that the movable panel element 36 can be situated in a corridor area so as to subdivide the latter.

The wall panel can also be replaced by a door, in which a third retaining area is provided to hold the door in a primary and a secondary retaining position.

As another option, an additional retaining area can also be provided, so that a wall panel or door can be fixed in another retaining position.

Figure 3A:
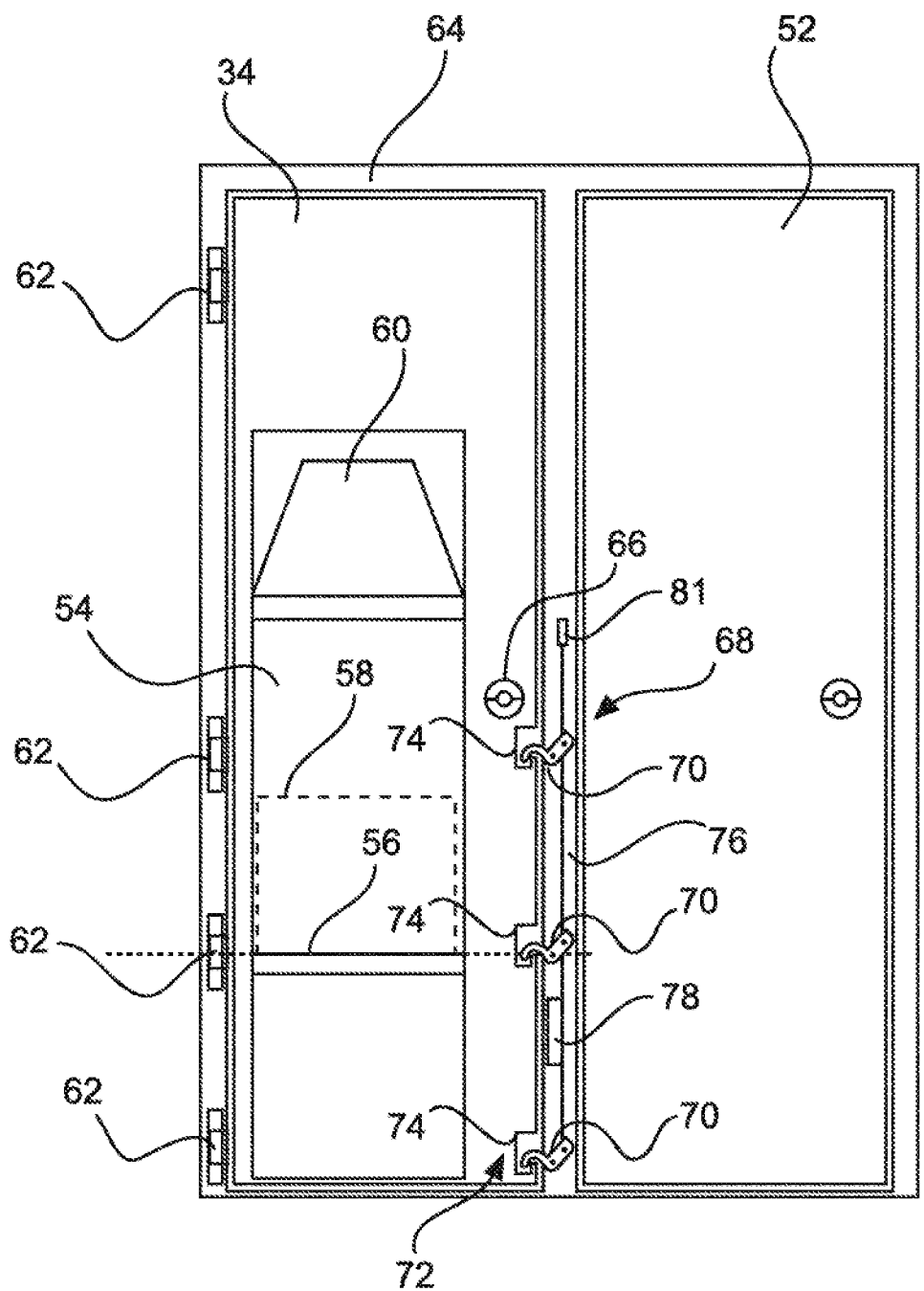
FIG. 3A shows another example for a retaining system with a flight attendant seat depicted as an option, which is integrated in a door element, wherein the view is shown combined with a vertical sectional view in the area of the locking device, along with a detailed illustration of a first example for a locking element in FIG. 3B and a second example in FIG. 3C.

FIG. 3A provides a schematic view of another example, in which the movable component 18 is designed as a door element 34 of a lavatory lying behind it. FIG. 3A denotes that yet another door element 52 is provided apart from the movable component 18 designed as a lavatory door. However, it is noted that this additional lavatory door 52 only represents an option. For example, the additional lavatory door 52 can be designed as a normal lavatory door, or also with a retaining system according to the present invention.

The door element 34 in FIG. 3A is designed with an integrated seat 54, which is provided as a temporarily usable seat. For example, a seat surface 56 is provided that can be moved from a use setting into a stowed setting. The seat surface is situated essentially horizontally in the use setting, and essentially vertically in the stowed position. The seat surface is depicted in the use setting on FIG. 3A, and the stowed setting is denoted with a dashed frame line 58. For example, a headrest area 60 can also be provided in an upper area. For example, belts are additionally also provided, but not shown in any greater detail, with which users can secure themselves even further. For example, the seat is a flight attendant seat, which is only used during specific phases of operation, for example during flight and/or ground phases of operation. For example, the flight attendant seat is used while moving on the ground on the runway or ramp (taxiing) in takeoff and landing phases (takeoff landing), both referred to combined as TTL phases, and also during flight phases with turbulences. No use of the lavatory lying behind it is envisaged during these times or flight phases.

For example, a plurality of lateral hinges 62 are provided so that additional loads caused by use of the seat can be transmitted from the door element 34 to a support structure not shown in any greater detail. The hinge elements 62 from the retaining device 20.

In an example shown as an option in FIG. 3A, the support structure 12 forms a frame 64, and the first retaining area 14 is provided on one frame side, while the second retaining area 16 is provided on an opposite frame side. For example, in FIG. 3A, the first retaining area 14 is provided to the left, and the second retaining area 16 to the right of the door element 34 or in the middle of the figures. The frame can even extend further, and can be designed to accommodate an additional door element, e.g., the additional door element 52.

An example provides that the movable component 18 be a swiveling door, for example as denoted in FIGS. 1 and 3. The movable locking elements can be designed to move in a radial direction, which has yet to be explained in more detail in particular in conjunction with FIG. 4.

In another example not shown, it is provided that the movable component 18 be designed as a sliding door, and that the movable locking elements can be moved in such a way as to prevent the door from sliding open in the locked setting.

An example shown as an option in FIG. 3A provides a first plurality 68 of movable locking elements, for example which are designed as several swiveling bolts 70. Also provided is a matching second plurality 72 of fixed locking receptacles, for example several recesses 74 in a continuous strike plate.

The swiveling bolts 70 can each be swiveled around a fulcrum between the open setting and locked setting, and can be moved with a shared final control element 76, for example. In the locked setting, for example, the movable locking elements engage a strike plate from behind in relation to the direction of movement of the movable component. In other words, the swiveling bolts engage into the recesses 74 (of the strike plate) in such a way as to prevent the door from swiveling open in the locked position. It can additionally be provided that the swiveling bolts also engage behind another element, for example a bolt provided in the receptacle, so as to themselves also be able to transmit forces in the plane of the door element from the door to the frame, for example tensile and compressive forces. When exposed to a load perpendicular to the door surface, e.g., when the door in a locked state is arranged transverse to the flight direction, which can also be referred to as the x-direction, the movable component, i.e., the door element or door leaf, cannot slide out of the retaining device/retaining position.

For example, the swiveling bolts 70 are provided in the door frame, and the strike plate on the door leaf. The swiveling bolts 70 can be made to move by an actuator 78, for example, which sets the swiveling bolts 70 in motion via the entire final control element 76. A status display for the locking device is shown as an option in the form of an indicator 81. The latter indicates whether the retaining system is in the locked state $S_{VER}$ or in the unlocked state $S_{OFF}$.

Figure 3B:
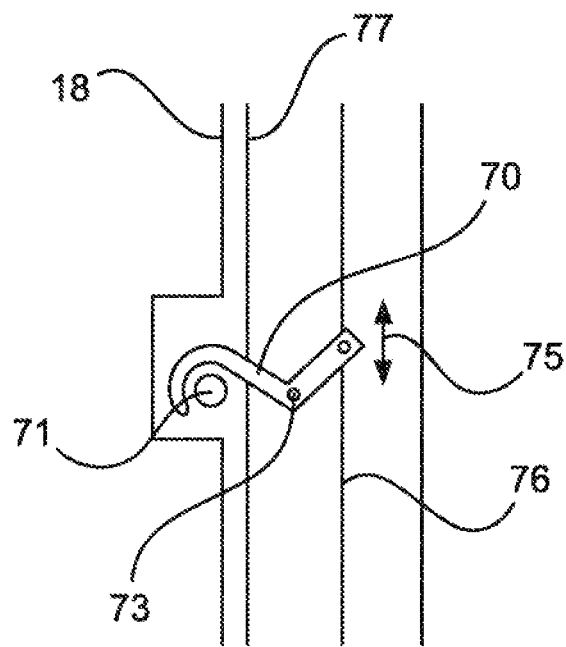
Figure 3C:
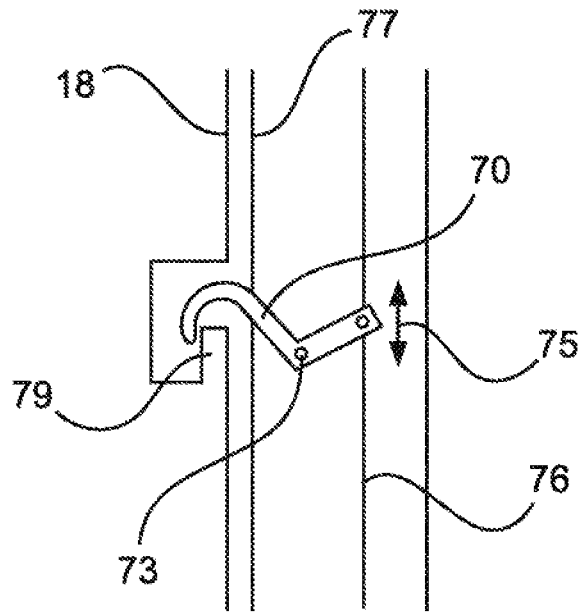

FIG. 3B shows a detailed cutout of a first example for the swiveling bolt 70. As will also be explained in more detail in conjunction with FIG. 4, it is provided that locking be improved by designing the swiveling bolts 70 like hooks, which partially encompass a bolt 71. The movement of the shared final control element 76 causes the swiveling bolt 70 to swivel around a fulcrum 73 in such a way that the swiveling bolt 70 engages behind the bolt for locking purposes. For example, the final control element moves in a vertical direction, as denoted with a double arrow 75. FIG. 3B and FIG. 3C denote that a movement gap can be provided between the movable component 18 and a frame 77 provided as the retaining device.

FIG. 3C shows a detailed cutout of a second example for the swiveling bolt 70. The hook-shaped swiveling bolt 70 engages behind a locking area 79 of a strike plate instead of the pin.

Figure 4:
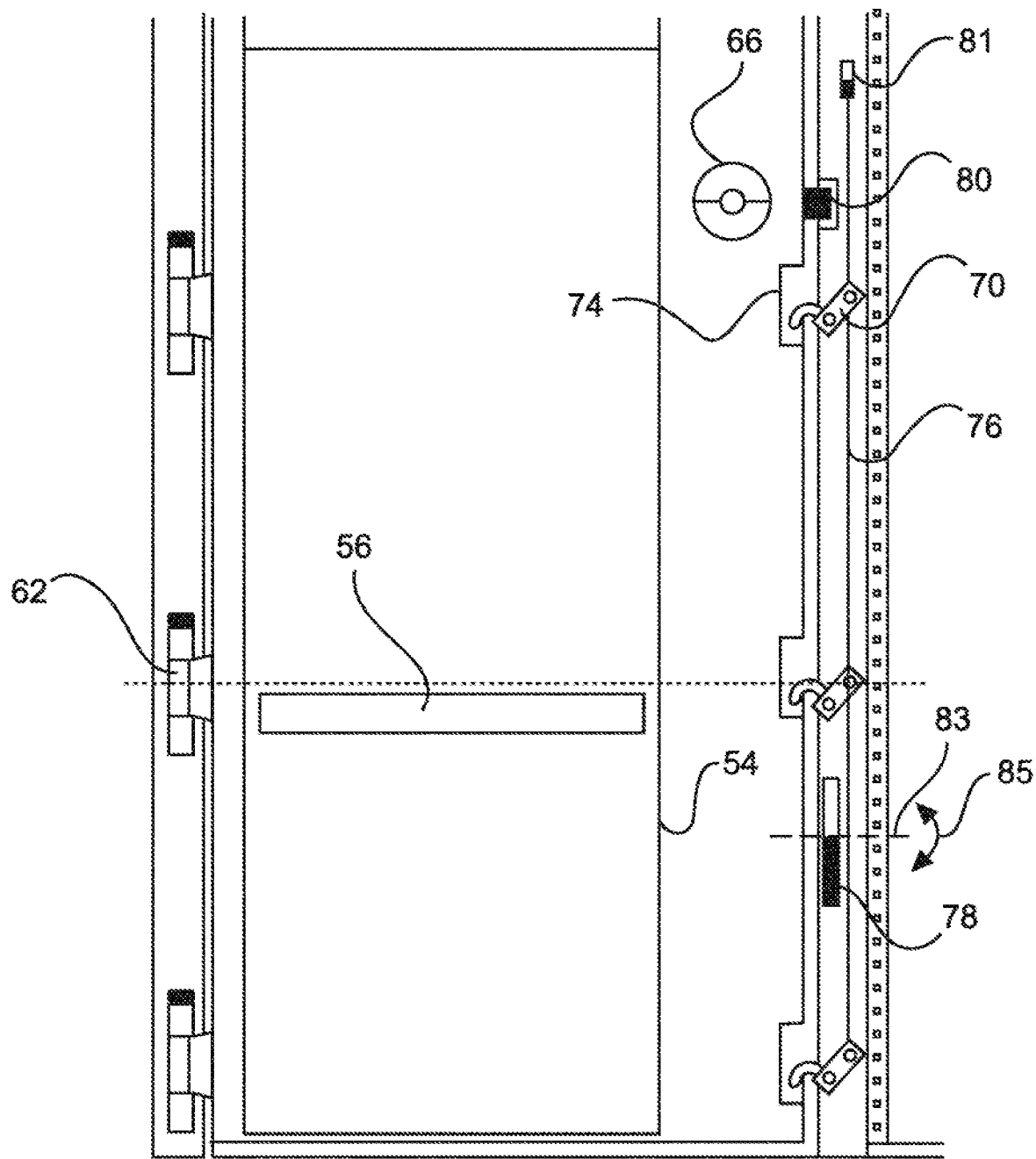
FIG. 4 is a slightly magnified cutout of the example of FIG. 3A.

As an option, FIG. 4 denotes an additional door locking device 80, which can be activated or operated with a door handle 66. For example, the door can thus be operated in the usual manner for use as a lavatory door. The locking device 22 provided according to the invention with the swiveling bolts shown as an example is only activated when the flight attendant seat is to be used and an increased transmission of force is required.

An example provides a time-delayed locking. A standard door lock is initially used to fix the door in the closed setting. In addition, the additional locking can then take place by way of the locking elements, for example for TTL phases or during turbulences, when the seat is being used.

FIG. 3A also denotes that the door element 34 can comprise the handle device 66 so that the door can be opened.

However, another example provides that the door locking device 80 is not provided, instead of which the job of operating the door handle 66 is also assigned to the actuator 78, so that use is also made of the locking device 22 with the swiveling bolts 70 for the normal utilization of the door, i.e., locking the lavatory door when using the lavatory.

In place of the swiveling bolt, another example provides that several bolts be provided that can be moved into the plane of the door, which engage into recesses similarly to the depicted recesses 74.

An example provides that a secondary locking device is provided in addition to the locking device for the movable component. The secondary locking device can be designed as a standard door locking device, for example. Activation of this secondary locking device can take place separately or be coupled with the (primary) locking device of the movable component. For example, the normal locking device of a lavatory door is provided for normal use as a lavatory. When using a seat structure, use can be made of the primary locking device. This can take place by way of the actuator, for example which is designed as a manual control lever that can be moved around a horizontal swiveling axis 83 (denoted with double arrow 85). The actuator can also be an electromechanical or electromagnetic or pneumatic or hydraulic actuator, for example which is activated and deactivated via a control signal. The actuating forces can be imparted by the actuator to the locking elements via transmission elements, such as wire rope hoists, rod assemblies, gearing mechanisms, hydraulic lines, etc.

The primary locking device can also be activated by way of the secondary locking device. For example, a standard door locking device can engage or snap into a strike plate. This standard door locking device, which can also be referred to as a secondary locking device within the framework of the present application, can then be used to move the swiveling bolts of the primary locking device via a lever (with the door closed). When opening the standard door locking device (as the secondary locking device), the primary locking device can then be reset using a spring.

Figure 5:
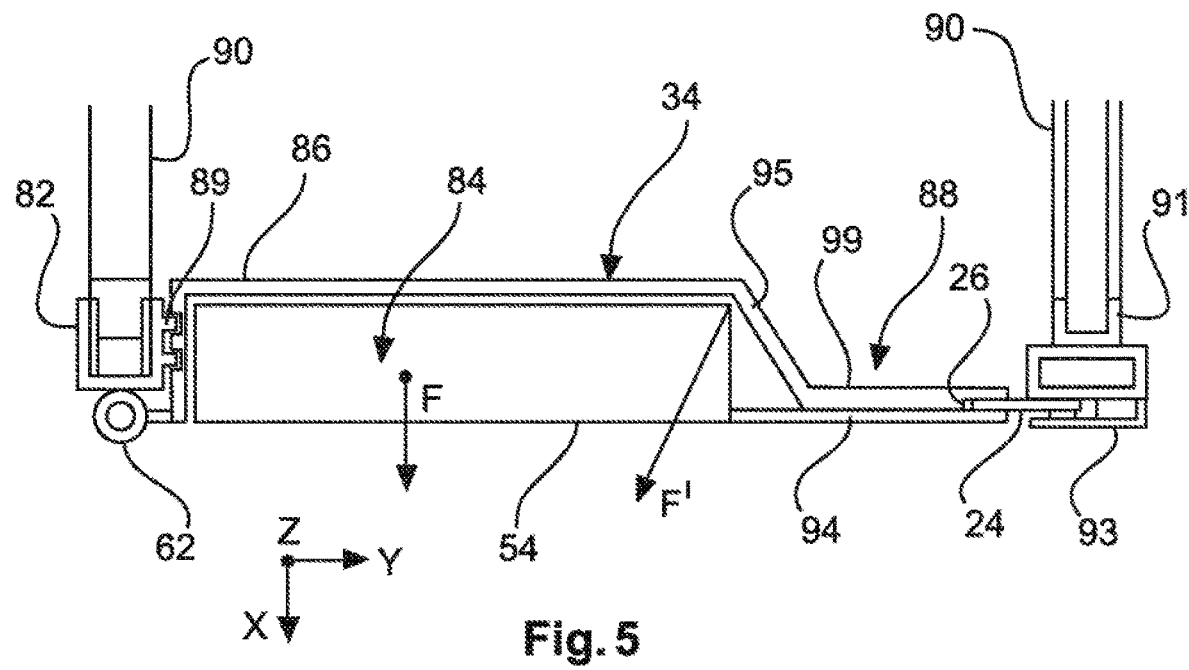
FIG. 5 is a horizontal section through the example of FIG. 3A and FIG. 4.

FIG. 5 shows a horizontal section through another example, and depicts a reinforcement 82 that is provided with the door hinges 62. The reinforcement can be placed on the wall structure (as shown) or also be integrated into the wall structure (not shown). The door element 34 is provided with a recess 84 in which the seat 54 is situated, so that the seat 54 does not protrude from the door surface. The door 34 comprises a reinforced, U-shaped box 86, and a reinforced door leaf piece 88 adjacent thereto. The movable locking elements 24 engage into the locking receptacles 26, which are situated in the reinforced door leaf segment 88. FIG. 5 also denotes two adjoining wall segments 90.

In an option shown in FIG. 5, the door in the closed state is additionally held on the hinge side with a side band locking mechanism 89, in which several pin-like projections engage into depressions on the door element.

The front edge of the wall segments 90 can be provided with a vertically running reinforcement 91, for example a U-profile, e.g., which prevents the doorpost from turning away.

Areas of the locking elements can be provided with a cover 93, which also serves to attach and secure the locking elements.

When combining the door with a seat device, for example a flight attendant seat (FAS), it may be necessary to configure the door structure for extreme load cases, for example for a load having an acceleration of 16 g dynamic, i.e., 16 times the g-force viewed from a dynamic standpoint. The person on the seat acts in conjunction with the seat device and belts, etc. with a force F. The depicted arrangement leads to a resultant F', which runs slantwise relative to F. In order to prevent the locking elements 24 from sliding out, the latter can engage pins or the like from behind. In addition, the door element 34 can be designed with a structural component in which a chamfer 95 is provided, which when exposed to a load causes the locking elements 24 to be pressed into the locking device earlier, thereby counteracting an extraction.

The chamfer 95 is shown as an option in FIG. 5. In addition to this geometric measure to help prevent the locking device from slipping out, other measures can be provided, e.g., (various) materials that allow a targeted deformation that counteracts the slipping out. In another envisaged possibility, structures are provided in the material that permit a targeted deformation that counteracts a slipping out.

As already mentioned, the door (as the movable component) can be held with a hinge component, i.e., with hinges. The side of the door lying opposite the hinge component, i.e., the free longitudinal side of the door, can taper acutely, obliquely or triangularly in an advantageous embodiment. For example, the side of the door lying opposite the hinge component tapers acutely. However, it is also possible for the side of the door lying opposite the hinge component to comprise a distinctly lower thickness than the side of the door lying in the area of the hinge component, without the door tapering acutely, obliquely or triangularly. The advantage of this is that more space remains free and thus readily traversable in front of the door, e.g., in an aisle passageway. Door components, such as door locking devices, can be adjusted to reflect the existing installation space and consider ergonomic aspects. The accessibility of a door locking knob or door locking lever can be adjusted by lengthening the rotational axis of the door locking knob, which roughly corresponds to an installation depth of the flight attendant seat or CAS.

The high acceleration forces arise, since the flight attendant seat must be situated in the direction of flight or opposite thereto. The person could not be sufficiently restrained even by belts parallel to the direction of flight. The direction of flight is denoted with an x-axis, the horizontal transverse direction with a y-axis. A z-axis running perpendicular relative to the leaf display denotes the vertical transverse direction, i.e., the direction from bottom to top in relation to the normal arrangement of an aircraft.

In the area next to the seat, a door leaf casing 94 can be provided in front of a structural component 99 situated behind it. The structural component 99 is part of a force-transmitting structure that extends over the entire door width, i.e., also in the area of the seat, since the entire door element absorbs the forces. The structural component 99 acts in conjunction with the U-shaped box 86 as a retaining structure for the seat. The structural component 99 and U-shaped box 86 are designed as an integrated component in one example. In another example, the U-shaped box for accommodating the seat also extends laterally beyond the seat until into the area of the door locking device.

The material used in the structural component for absorbing the retaining forces of the seat can allow deformations within a defined range.

Figure 6:
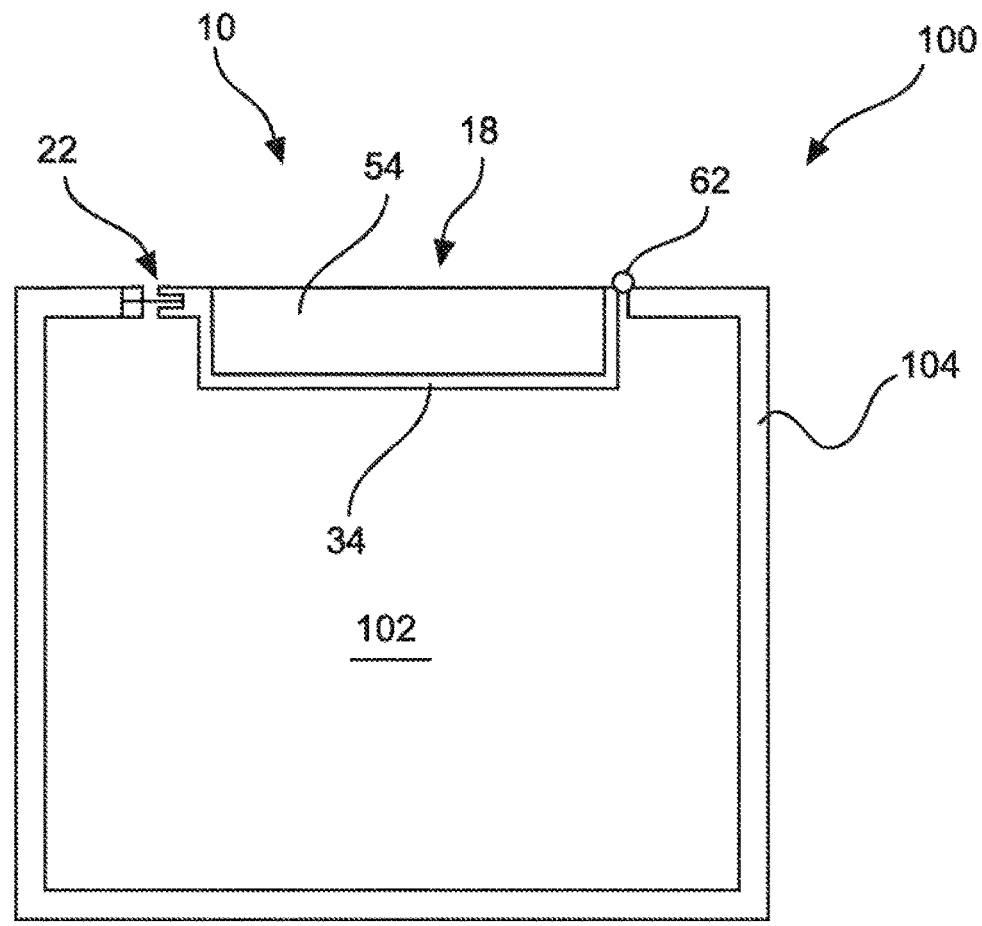
FIG. 6 is an example for a module for a cabin of an aircraft.

FIG. 6 shows an example for a module 100 for a cabin of an aircraft. The module 100 comprises a module interior 102 and a wall structure 104. The wall structure 104 at least partially envelops the module interior 102. The wall structure 104 is designed with a retaining system 10 according to one of the preceding examples. For example, the module interior is a lavatory with a washbasin not shown in any more detail and a toilet also not shown in any more detail. The retaining system 10 comprises the door element 34 as the movable component 18, which is movably held with the hinges 62 on the one side, and can be locked with the locking device 22 on the other side. For example, the door element 34 comprises the seat 54, which is not shown in more detail in FIG. 6.

Figure 7A:
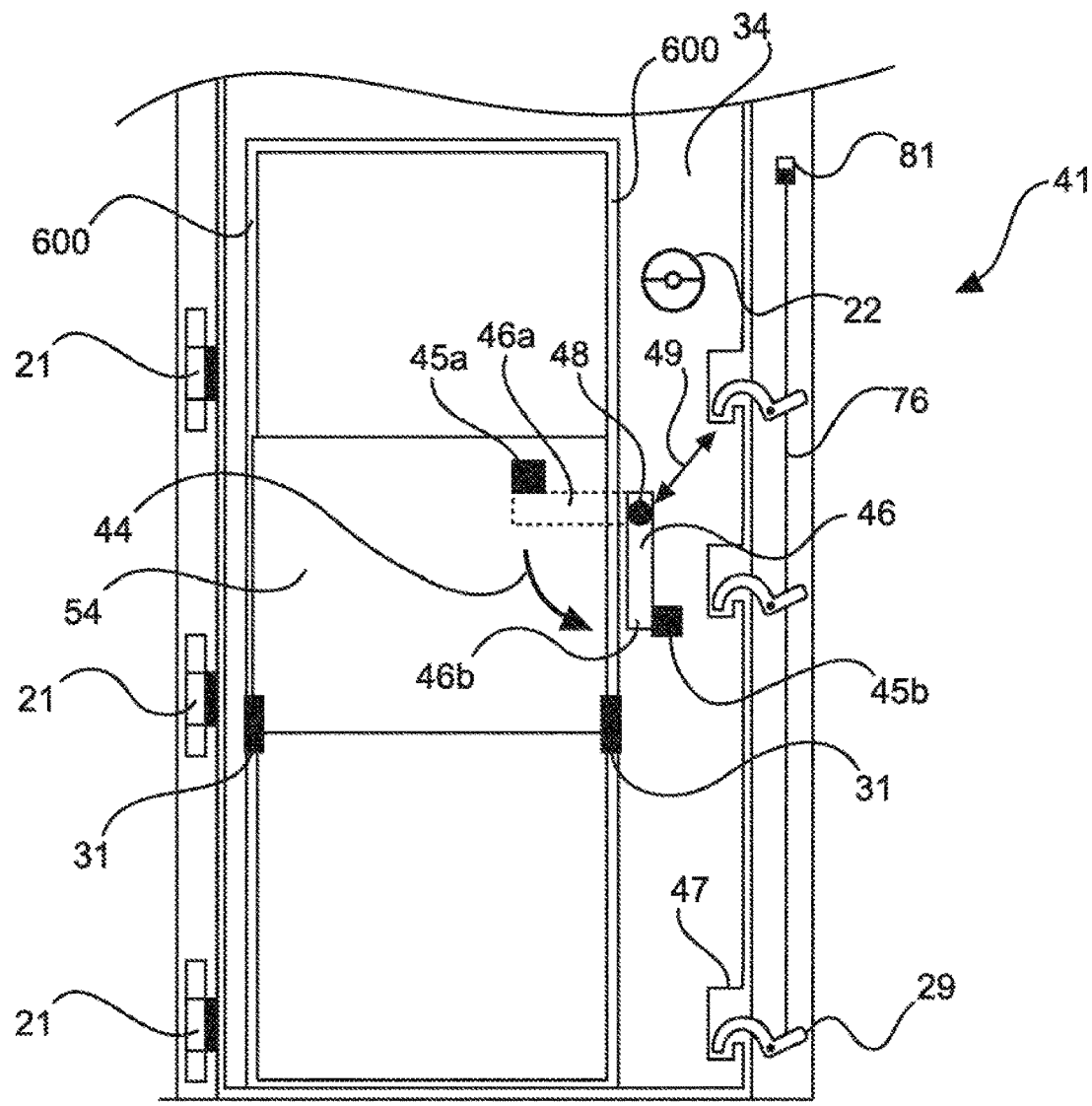
FIG. 7A is a locking mechanism with locked door.

FIG. 7A depicts a locking mechanism 41 with a locked door element 34 or with a locked door, wherein the upper part of the door 34 is not shown. A standard CAS or simple CAS (cabin attendant seat) can be a defined structural unit that is not to be adapted, is attached to the door 34 via mechanical interfaces, and among other things comprises a seat or folding seat, e.g., the mentioned integrated seat 54 connected to the CAS structural unit by a hinge 31. It is also possible to provide CAS configurations with electrical interfaces, such as an interface for a handset that comprises corresponding electrical connections like cables from the CAS to the module. The CAS can further comprise a storage compartment with mechanical interfaces for CAS-specific equipment. It is noted that standard CAS can also be referred to simply as CAS, and that a CAS, or a CAS structural unit, represents a seat, or can comprise a seat, in particular a folding seat.

In particular, the seat 54 can be hinged to the CAS or to the door 34, so that it is designed to be folded or swiveled from the perpendicular stowed position into the horizontal operating position and vice versa. The door can be attached to a wall of the module by hinge components 21.

For reasons of clarity, the seat 54 in FIG. 7A is depicted in the perpendicular stowed position, so that a bottom side of the seat 54 is visible here.

Figure 7B:
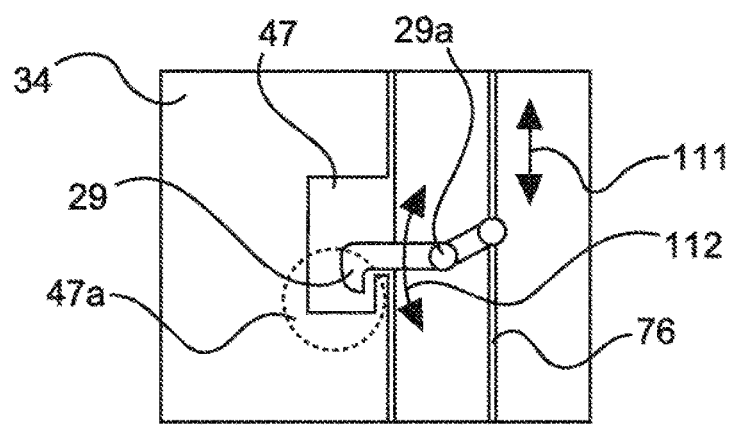
FIG. 7B is a cutout of the bolt of a locking mechanism.
Figure 7C:
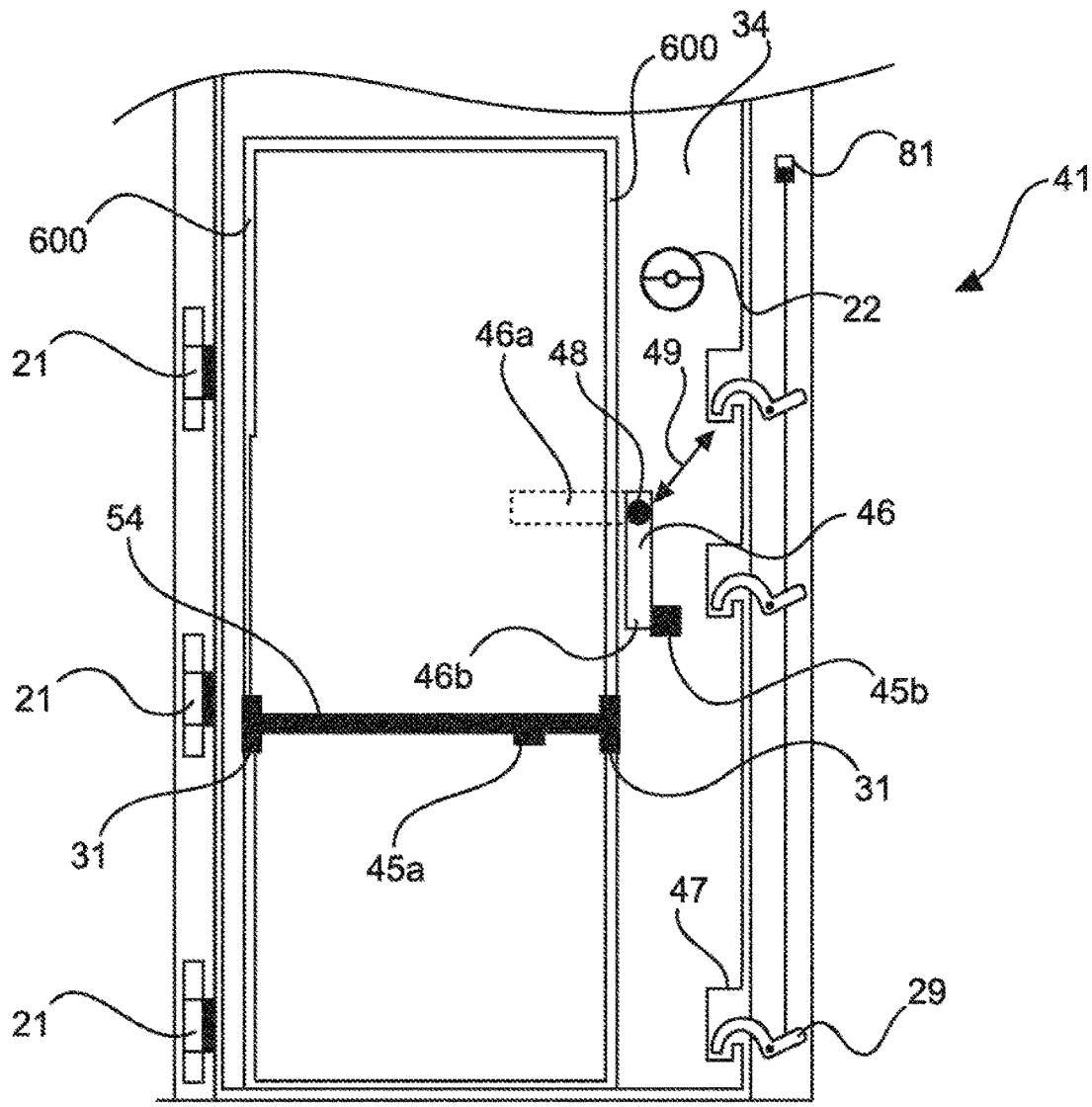
FIG. 7C is a locking mechanism with locked door and folded out seat.

FIG. 7C shows the seat 54 in the horizontal operating position, i.e., in the folded out state.

The seat 54 can be moved into the horizontal operating position if a lever 46 is situated in an unlocked position 46b. The lever 46 can be pivoted around an axis 48, which is attached to the door leaf or to the door 34. For example, the lever 46 can be biased by a biasing unit or spring element, so that the lever 46 can only be actuated through exposure to a force. In other words, a force can be required to move the lever 46 from a locked position 46a of the folding seat of the CAS, shown dashed in FIG. 7A, into the unlocked position 46b of the folding seat of the CAS. For example, this actuation can be effected by a rotational movement 44 in the direction of the cabin floor. The spring element can be a torsion spring situated around the rotational axis 48 of the lever. Stoppers 45a and 45b can be provided to lock the lever in the respective state.

The lever 46 is functionally connected to the locking mechanism by a connecting mechanism 49 (not shown in detail). The connecting mechanism only allows the lever 46 to move if the swiveling bolts 70 are engaged with the locking receptacles, thereby locking the door. For example, a lock mechanism is provided that prevents the lever 46 from being unlocked in an initial state. By locking the door, i.e., when the locking elements engage into the recesses on the door leaf, the lock mechanism or the respective lock components are moved into a second state in which an unlocking of the lever 46 is possible.

FIG. 7B shows a cutout of the locking mechanism 41 with the door 34 locked. In particular, bolts 29 engage in recesses 47 of the door leaf, so that the door 34 not shown in any more detail here is in the locked state. A curved arrow 112 denotes the rotational directions of the bolt 29 around a rotational axis 29a. The rotational movement 112 of the bolt 29 allows the bolt 29 to be latched into or unlatched from the recess 47, so as to lock the door 34 in this way. The rotational movement 112 of the bolt 29 is generated by the final control element 76, specifically by moving the final control element back and forth in the vertical direction, i.e., having it perform a translational movement 111.

A status display for the locking device of the door 34 can be provided in the form of recesses or in the form of inspection windows, holes or openings 47a in the area of the door leaf or door leaf edge. These inspection windows 47a are shown dashed in FIG. 7B, and can be situated on a front side in relation to a viewing direction of a person standing in front of the module, allowing direct visual contact with the swiveling bolt 29 in the locked position. The swiveling bolt 29 can comprise a color marking that denotes a positive locking. If the swiveling bolt 29 is switched to the open position, the color marking is no longer visible, and indicates a defined state.

The locking display for each swiveling bolt 29 advantageously makes it possible to ensure the transmission of force from each swiveling bolt 29, and given a failure of a swiveling bolt 29, for example, use of the seat 54 or CAS can continue, depending on the definition.

The locking mechanism 41 itself can be integrated into the doorpost, partially integrated or attached on the doorpost, so that the latter is not visible from outside, i.e., from the aircraft cabin.

FIG. 7C shows the locking mechanism 41 with locked door 34, wherein the seat 54 is depicted in the folded out state, i.e., in the horizontal operating position. The seat 53 can here be folded out, since the lever 46 is in the unlocked position 46b.

Figure 7D:
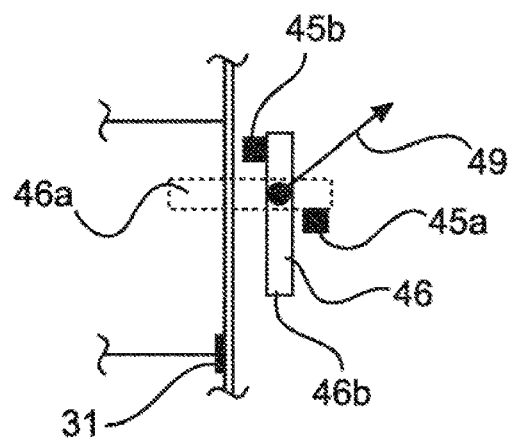
FIG. 7D is a lever for locking the folded out seat in an unlocked position.

FIG. 7D shows the lever 46 in conjunction with the stoppers 45a and 45b, which both are provided on the door. The stoppers are thus not provided on the bottom side of the seat 54 as depicted in FIGS. 7A to 7C. The stoppers are designed to hold the lever in the respective position, i.e., in the locked or locked setting. This makes it possible to arrange the relevant components for locking the seat, e.g., for holding the seat 54 in the vertical stowed setting, and also other components, for example interfaces, on the door. As a result, the seat 54 can be integrated into the door without changing the technical characteristics of the seat 54, since all components relevant for holding the seat in the locked setting can be provided on the door leaf.

The connecting mechanism 49 for specifically blocking or releasing the movement of the lever 46 as a function of locking the door with the swiveling bolt 70 is denoted by an arrow, which represents the functional connection. The lever 46 is shown in the unlocked setting 46b, in which the seat can be moved.

Figure 8A:
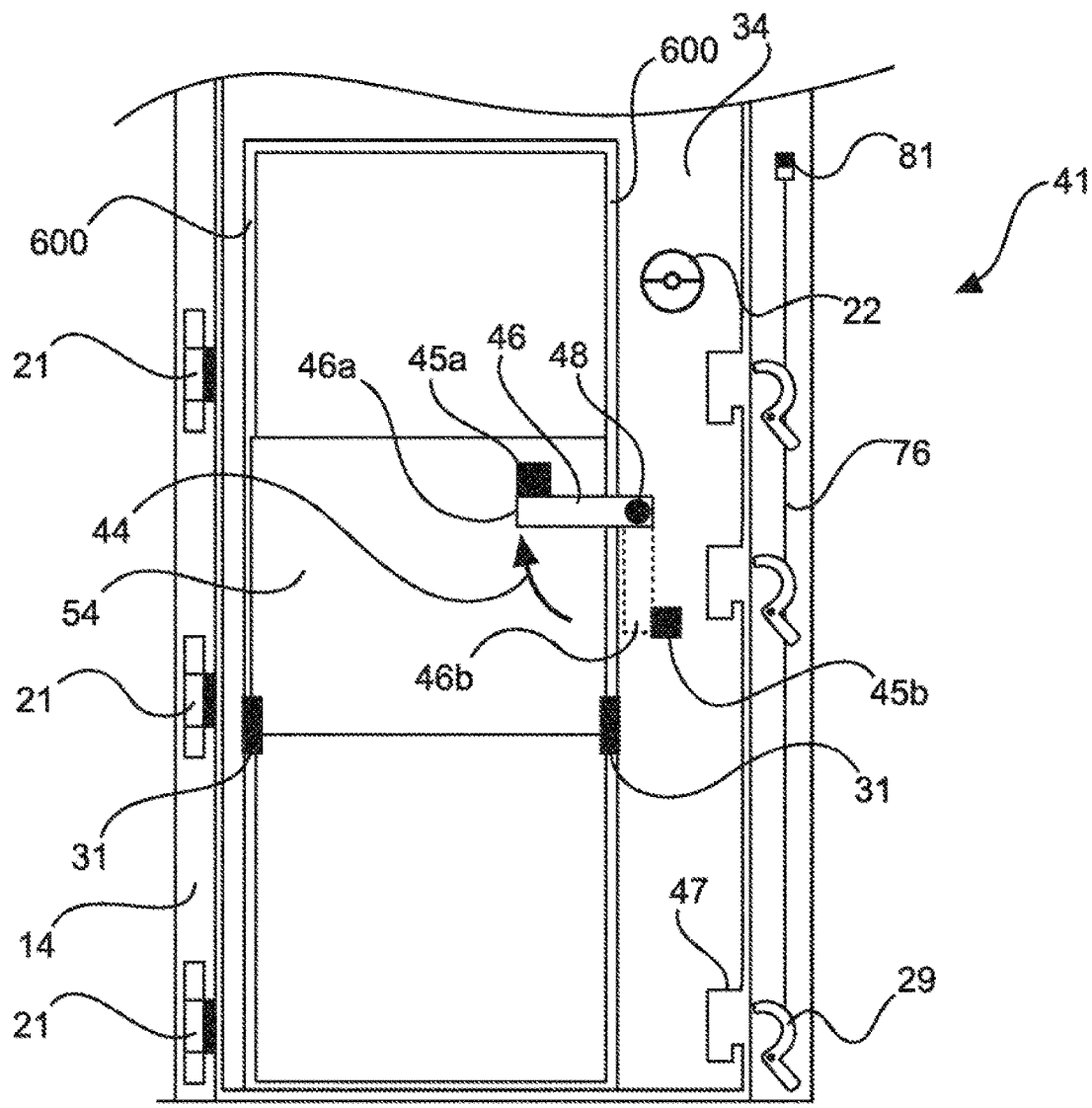
FIG. 8A is a locking mechanism with unlocked door.

As opposed to FIG. 7A, FIG. 8A shows the locking mechanism 41 with unlocked door 34. It can be provided in particular that the (folding) seat 54 must be switched into the perpendicular stowed position before the door 34 can be opened. In the case depicted in FIG. 8A, the seat 54 cannot be moved into the horizontal operating position, since the lever 46 is in the locked position. The seat 54 is thus in the vertical stowed position, so that the bottom side of the seat 54 is again visible. In this case, a force is required to move the lever 46 from the locked position 46a of the seat shown here into the unlocked position 46b of the seat, so that the seat 54 can again be folded out. For example, this actuation can take place via the rotational movement 44.

As may be gleaned from FIG. 8A, the bolts 29 are unlatched from the respective recess 47, making it possible to open the door 34. At the same time, the seat 54 is prevented from swiveling into the essentially horizontal operating position, since the lever 46 is situated in the locked position 46a. The indicator 81 further denotes the unlocked state of the door 34.

Figure 8B:
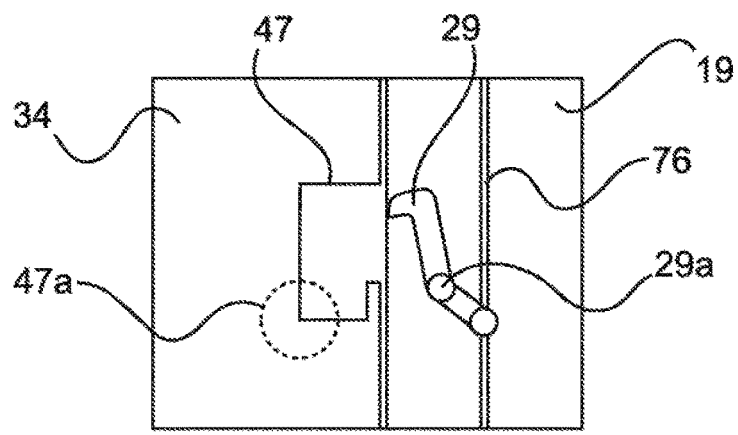
FIG. 8B is a cutout of another bolt of a locking mechanism.

FIG. 8B shows a cutout of the locking mechanism 41 with the door 34 unlocked. The bolt 29 is here unlatched from the recess 47. The rotational movement of the bolt 29 around the rotational axis 29a is effected by the translational movement of the final control element 76. For example, the bolt 29 can be shaped like a bolt claw, which can be latched into a projection inside the recess 47 of the door leaf. With the door 34 open, i.e., when the swiveling bolts 29 are unlatched, the swiveling bolts 29 can be completely recessed into the doorjamb, so that the swiveling bolts 29 disappear completely into the door leaf. This is important in particular with respect to personal protection.

Figure 9A:
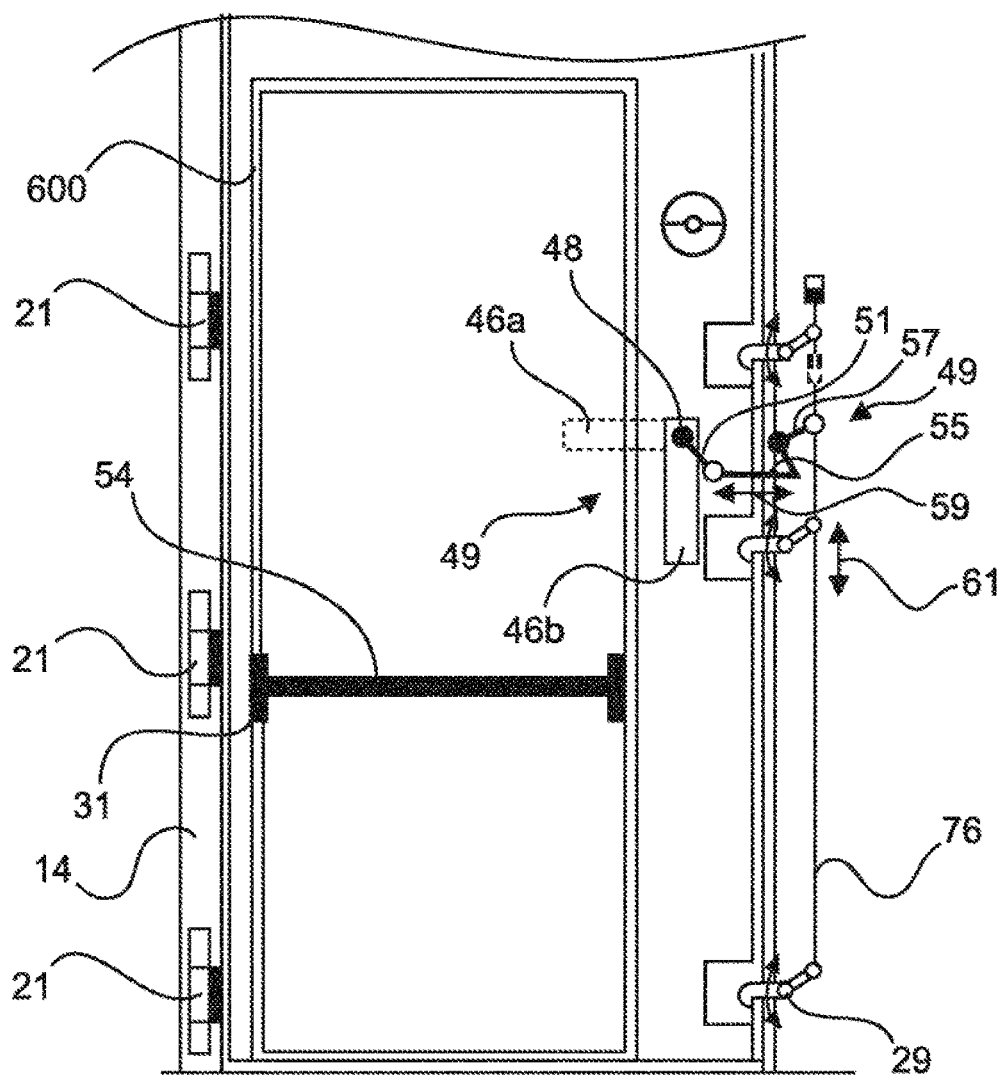
FIG. 9A is another example of a locking mechanism shown as a front view of the door.
Figure 9B:
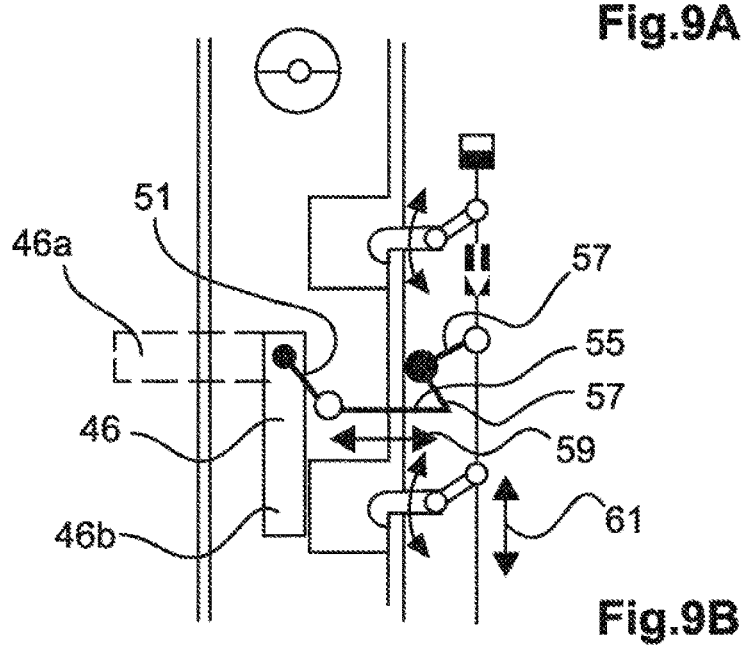
FIG. 9B is a cutout of the mechanism shown in FIG. 9A.

FIG. 9A shows an example of the connecting mechanism 49 already mentioned above. The handle for releasing the seat 54, i.e. the lever 46 is connected with an actuating element 51 that is connected to a rod 55. Upon moving the lever from the locked position 46a in the unlocked position 46b, i.e. to release the seat 54, the actuating element 51, exerts a pushing force on the rod, which is moved along its length direction. The rod 55 is moved in a bearing cavity such that it extends beyond the door leave and reaches into a receptacle provided in the door frame. In the receptacle, the rod acts upon a further lever element 57 that is connected to the final control element 76. The further lever element 57 is supported in a pivotable manner to perform a rotating movement in dependency of the movement of the final control element 76. Without the rod 55 extending from the door front end into the receptacle, the further lever element 57 can freely move and hence the final control element 76 can be operated to activate or deactivate the door locking mechanism. However, once the rod is moved into the receptacle, the door locking mechanism can no longer be operated since the further lever element 57 is blocked in its movement by the rod 55 and hence the final control element 76 can also not move. In other words, the activated seat lever 46 blocks the door locking mechanism and prevents that the door is unlocked. Further, the connecting mechanism 49 is also arranged such that the seat lever 46 can only be operated, if the door is properly locked. For this purpose, if the door is not locked via the final control element 76 of the locking mechanism, the further lever element 57 is arranged inside the receptacle such that the rod cannot be further inserted. In other words, the further lever element 57 blocks the rod 55 if the locking mechanism is not properly locked. A double arrow 59 indicates the back and forth movement of the rod 55. A further double arrow 61 indicates the up and down movement of the final control element 76.

It is noted that a lever of a taxi/takeoff/landing (TTL) locking mechanism can also be provided on the fixed frame portion, i.e. attached on the fixed doorpost. In such case, a functional connection between the TTL lever and the foldable seat is provided to allow a locking mechanism of the seat in dependency of the TTL lever. Further, there is also provided a connection between the TTL lever and the door locking mechanism to ensure that the foldable seat can only be used when the door is properly locked.

Figure 10A:
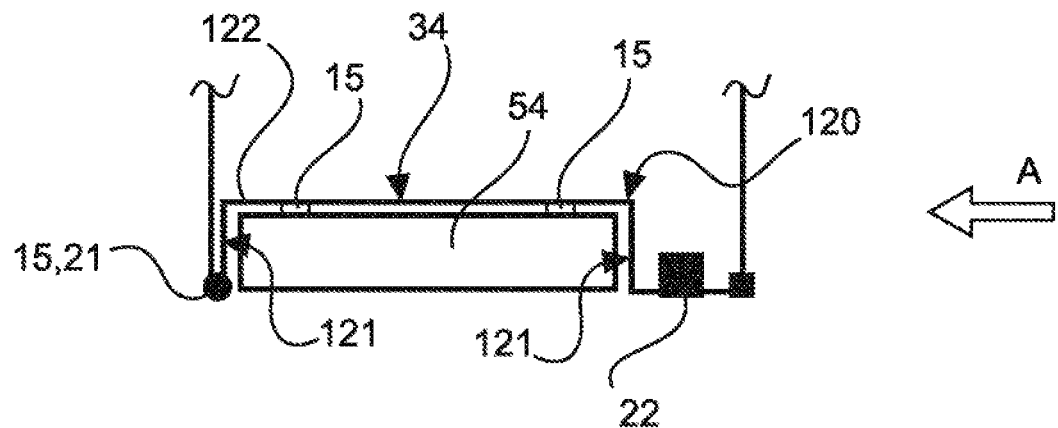
FIG. 10A is a top view of a seat embedded in a pocket of the door.

FIG. 10A shows a top view of a seat 54 let into a door pocket 120 of the door 34. The door pocket 120 is to be regarded as a depression in the door 34. The door pocket 120 comprises two lateral surfaces 121 parallel to the vertical direction, along with a rear surface 122 also parallel to the vertical direction. The seat 54 is here at least partially or completely recessed into the door 34 or door pocket 120. If the seat 54 is only partially recessed into the door pocket 120, it can protrude by about 1 cm from the door 34 when in the vertical stowed position. For example, the seat 54 has a width of about 45 cm, and a height of about 140 cm. The ratio of seat width to door width can measure about 0.7.

The seat 54 can further be detachably attached to the rear surface 122 of the door pocket 120 by mechanical retainers 15. Electrical interfaces or data interfaces can also be provided in the pocket 120, which connect the seat 54 or CAS with onboard electronics in the aircraft. In particular, the seat 54 or CAS can be provided with ports for electrical devices and mobile terminals, so that a person sitting on the (folding) seat 54 can use such devices.

Figure 10B:
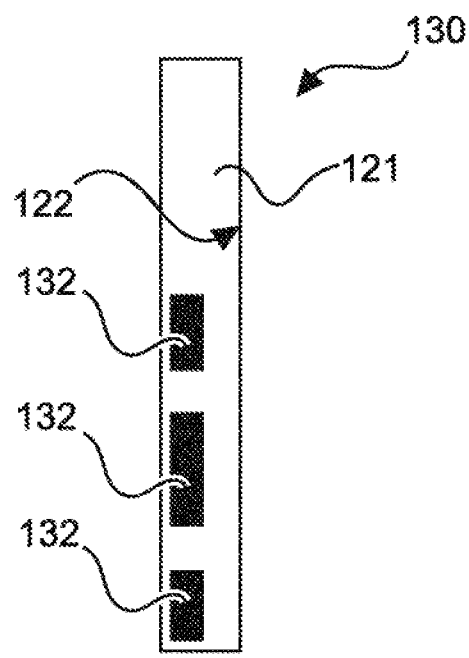
FIG. 10B is a ventilation system of a module.

FIG. 10B shows a ventilating system 130 of the module in the viewing direction A marked by the arrow in FIG. 10A. The ventilating system 130 comprises several ventilating units 132. In the configuration depicted in FIG. 10B, three ventilating units 132 are shown. The ventilating units can be integrated into the door pocket 120 of the door 34. In particular, the ventilating units 132 can be provided in one of the lateral surfaces 121 or in both lateral surfaces 121 of the door pocket 120. As a consequence, the ventilating units are completely or partially covered by the seat 54 when the seat 54 or CAS is attached in the door pocket 120. The seat 54 can have a smaller width than the door pocket 120, so that a gap 600 is situated between the seat 54 or CAS and the lateral surfaces 121, as depicted on FIGS. 7A, 7C, and 8A. The module can be equipped with a suction ventilator, and draws in cabin air through the gap 600 and lateral ventilating units 132 of the door pocket 120. It is possible for the percentage of openings in the ventilating units 132 relative to the cross section measure to measure 1% to 2% of the surface of the door leaf of the door 34. The openings in the ventilating units 132 can comprise a round, oblong or other shape favorable to production and flow.

Figure 11:
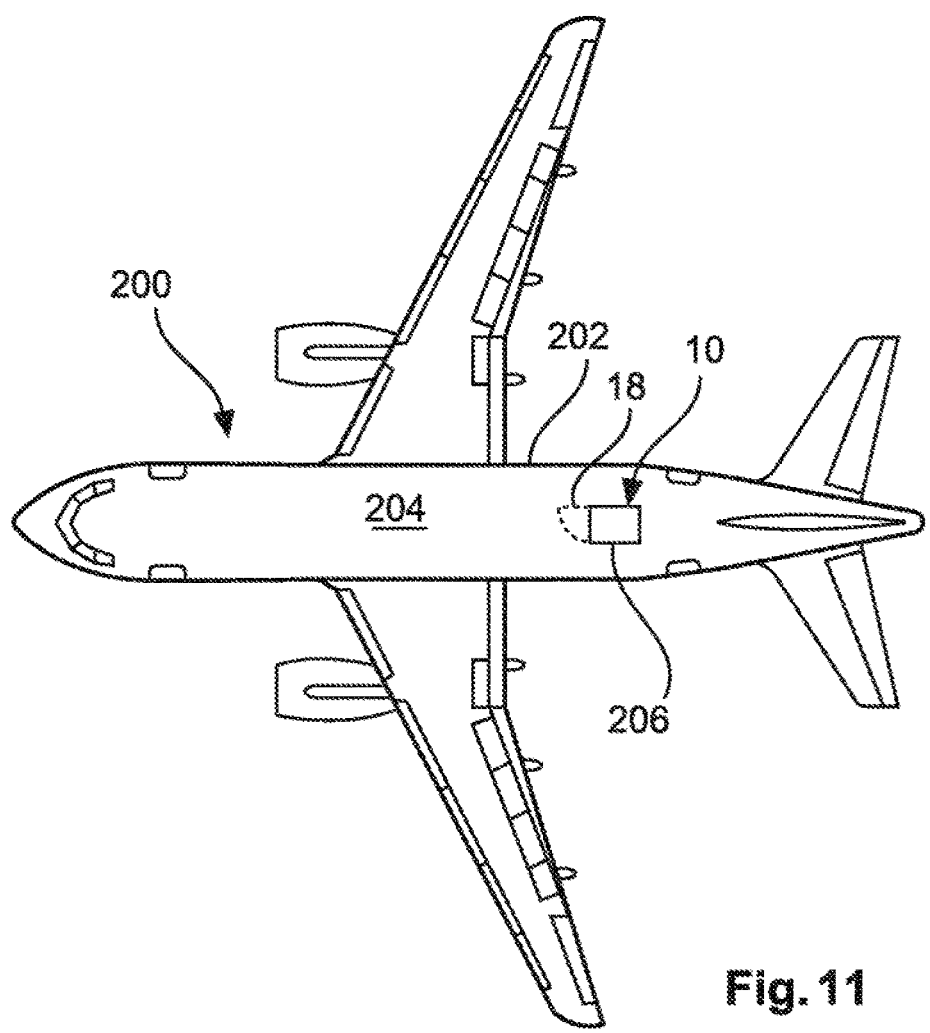
FIG. 11 is a schematic horizontal section through an example of an aircraft.

FIG. 11 shows an aircraft 200 that comprises a fuselage structure 202 and a cabin area 204 situated in the fuselage structure. The cabin area 204 comprises at least one module 206 from the group of lavatory, washroom, storage space, closet, relaxation area, monument, onboard kitchen and staircase. The at least one module 206 is designed like the module 100 according to the preceding example, and comprises the retaining system 10 according to one of the examples described above. For example, the aircraft is an airplane, in particular a passenger plane. The aircraft can also be provided as a helicopter or airship. For example, the module 206 comprises the component 18 as a movable door, which is equipped with a flight attendant seat, which can be used in the closed setting of the door, and hence aligned along the longitudinal axis of the aircraft.

Figure 12:
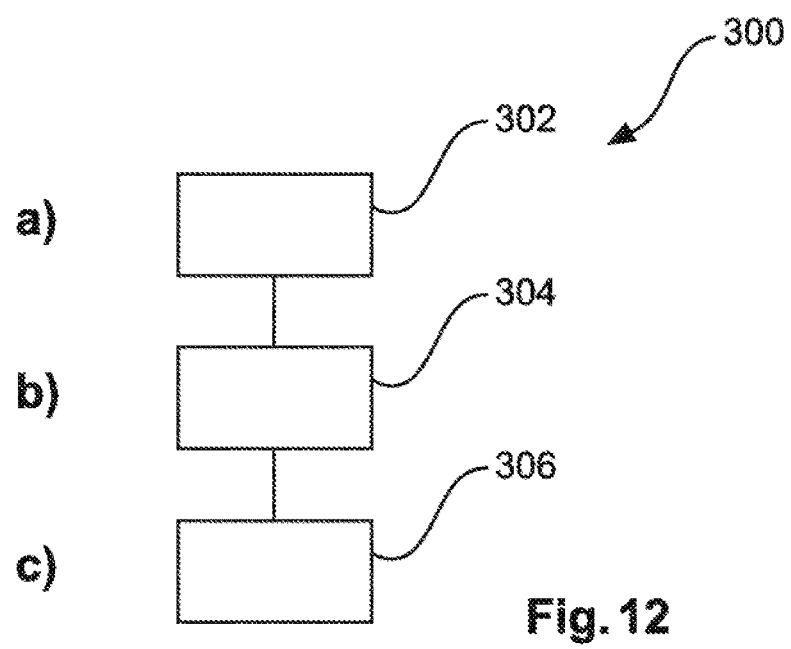
FIG. 12 is an example for a method of locking and releasing a movable component on board an aircraft.

FIG. 12 shows a method 300 for locking and releasing a movable component on board an aircraft. The method comprises the following steps:

In a first step 302, a support structure is provided with a first retaining area and a second retaining area. The first step 302 can also be referred to as step a).

In a second step 304, a movable component is provided, which is movably attached to the first retaining area with a retaining device, and which can be locked on the second retaining area with a locking device. The locking device comprises at least one movable locking element and at least one locking receptacle. The second step 304 can also be referred to as step b).

In a third step 306, the at least one movable locking element is moved between an open setting and a locked setting or vice versa, so as to temporarily lock or release the movable component. The at least one movable locking element is engaged with the locking receptacle in the locked setting, so that the movable component is temporarily immovably retained. The movable component is allowed to move in the open setting. The at least one movable locking element is situated on the second retaining area, and the at least one locking receptacle is situated on the movable component. The third step 306 can also be referred to as step c).

In another example, the movable component is a door designed with a seat that is temporarily usable. For example, the door is an access door for a monument, for example a lavatory door; for example, the seat is a flight attendant seat. For the use as a flight attendant seat, the locking device is initially moved into the locked setting so as to lock the door. The flight attendant seat is subsequently used. To this end, for example, a seat element can be designed as a folding seat, which is folded down from a stowage setting into a use setting. Once a person has then sat down on the seat, the person can buckle up.

After the flight attendant seat has been used, the latter can be stowed again, e.g., folded up. The locking device can then be unlocked again, so as to be able to move the movable component.

A variant provides that the lavatory door comprises an additional door retaining mechanism apart from the locking device, e.g., a conventional door lock device. The additional door retaining mechanism is utilized for "normal use" as a lavatory door, i.e., to gain access to the monument, for example. The locking device according to the present invention is then utilized for using the seat, so as to be able to intercept the necessary 16 g crash loads of the flight attendant seat, i.e., for cases involving exposure to 16 times the g force.

An example provides that the flight attendant seat can only be folded down if the locking device has been moved into the locked setting, e.g., when a plurality of movable locking elements is engaged with corresponding locking receptacles.

An example provides that the locking device is automatically moved into the locked setting when folding down the flight attendant seat.

The exemplary embodiments described above can be combined in a variety of ways. In particular, aspects of the method can also be utilized for embodiments of the devices and uses of the devices and vice versa.

It is additionally noted that "comprising" does not preclude any other elements or steps, and "a" or "an" does not rule out a plurality. It is further noted that features or steps that were described with reference to one of the above exemplary embodiments can also be used in combination with other features or steps from other exemplary embodiments described above. Reference numbers in the claims are not to be construed as a limitation.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. A retaining system for a movable component on board an aircraft, with the system comprising:
    a support structure with a first retaining area and second retaining area;
    a movable component;
    a retaining device; and
    a locking device;
    wherein the movable component is movably attached to the first retaining area with the retaining device, and wherein the movable component is configured to be locked to the second retaining area with the locking device;
    wherein the locking device comprises at least one movable locking element and at least one locking receptacle;
    wherein the at least one movable locking element is configured to be moved between an open setting ($S_{OFF}$) and a locked setting ($S_{VER}$), wherein the at least one movable locking element engages with the locking receptacle in the locked setting, so that the movable component is temporarily immovably retained, and allows the movable component to move in the open setting; and
    wherein the at least one movable locking element is mounted on the second retaining area, and wherein the at least one locking receptacle is mounted on the movable component.

2. The retaining system of claim 1, wherein the movable component is a door element, and the door element comprises at least one locking receptacle thereon.

3. The retaining system of claim 1, wherein the movable component is a movable panel element.

4. The retaining system of claim 1, wherein the support structure comprises a third retaining area and
    at least one further movable locking element,
    wherein the movable component is configured to be locked in a primary retaining position ($H_{pos1}$) on the second retaining area; and
    wherein the movable component is configured to be locked in a secondary retaining position ($H_{pos2}$) on the third retaining area.

5. The retaining system of claim 1, further comprising: a first plurality of movable locking elements a matching second plurality of locking receptacles.

6. The retaining system of claim 1, further comprising a temporarily usable seat attached to the movable component.

7. The retaining system of claim 6, further comprising a locking mechanism configured to only allow the seat to swivel from an essentially perpendicular stowage position into an essentially horizontal operating position if the door is locked.

8. A module for a cabin of an aircraft, wherein the module comprises:
    a module interior; and
    a wall structure that at least partially envelops the module interior;

wherein the wall structure is configured with at least one retaining system for a movable component on board an aircraft, with:

a support structure with a first retaining area and second retaining area;

a movable component;

a retaining device; and a locking device;

wherein the movable component is movably attached to the first retaining area with the retaining device, and wherein the movable component is configured to be locked to the second retaining area with the locking device;

wherein the locking device comprises at least one movable locking element and at least one locking receptacle;

wherein the at least one movable locking element is configured to be moved between an open setting ($S_{OFF}$) and a locked setting ($S_{VER}$), wherein the at least one movable locking element engages with the locking receptacle in the locked setting, so that the movable component is temporarily immovably retained, and allows the movable component to move in the open setting; and wherein the at least one movable locking element is mounted on the second retaining area, and wherein the at least one locking receptacle is mounted on the movable component.

9. An aircraft, with:

a fuselage structure; and a cabin area situated in the fuselage structure;

wherein the cabin area comprises at least one module from the group comprising lavatory, washroom, stowage space, closet, relaxation space, monument, onboard kitchen and staircase; and wherein the at least one module comprises:

a module interior; and a wall structure that at least partially envelops the module interior;

wherein the wall structure is configured with at least one retaining system for a movable component on board an aircraft, with:

a support structure with a first retaining area and second retaining area;

a movable component;

a retaining device; and a locking device;

wherein the movable component is movably attached to the first retaining area with the retaining device, and wherein the movable component is configured to be locked to the second retaining area with the locking device;

wherein the locking device comprises at least one movable locking element and at least one locking receptacle;

wherein the at least one movable locking element is configured to be moved between an open setting ($S_{OFF}$) and a locked setting ($S_{VER}$), wherein the at least one movable locking element engages with the locking receptacle in the locked setting, so that the movable component is temporarily immovably retained, and allows the movable component to move in the open setting; and wherein the at least one movable locking element is mounted on the second retaining area, and wherein the at least one locking receptacle is mounted on the movable component.

10. A method for locking and releasing a movable component on board an aircraft, wherein the method comprising:

a) providing a support structure with a first retaining area and a second retaining area;

b) providing a movable component, which is movably attached to the first retaining area with a retaining device, and is configured to be locked on the second retaining area with a locking device, wherein the locking device comprises at least one movable locking element and at least one locking receptacle;

c) moving the at least one movable locking element between an open setting and a locked setting, so as to temporarily lock or release the movable component; wherein the at least one movable locking element engages with the locking receptacle in the locked setting, so that the movable component is temporarily immovably retained, and allows the movable component to move in the open setting; and wherein the at least one movable locking element is mounted on the second retaining area, and wherein the at least one locking receptacle is mounted on the movable component.

* * * * *